US008898950B1

(12) United States Patent
West

(10) Patent No.: US 8,898,950 B1
(45) Date of Patent: Dec. 2, 2014

(54) ICE FISHING STRIKE INDICATOR

(71) Applicant: Brian R. West, Rhinelander, WI (US)

(72) Inventor: Brian R. West, Rhinelander, WI (US)

(*) Notice: Subject to any disclaimer, the term of this patent is extended or adjusted under 35 U.S.C. 154(b) by 0 days.

(21) Appl. No.: 13/761,811

(22) Filed: Feb. 7, 2013

Related U.S. Application Data

(60) Provisional application No. 61/599,520, filed on Feb. 16, 2012.

(51) Int. Cl.
A01K 97/12 (2006.01)
A01K 93/00 (2006.01)
A01K 97/01 (2006.01)

(52) U.S. Cl.
CPC .............. *A01K 97/01* (2013.01); *A01K 97/12* (2013.01)
USPC .................................................. 43/17; 43/16

(58) Field of Classification Search
CPC ............................... A01K 97/12; A01K 93/02
USPC ........................................................ 43/16, 17
See application file for complete search history.

(56) References Cited

U.S. PATENT DOCUMENTS

| 2,693,046 | A | * | 11/1954 | Langevin | 43/17 |
| 2,803,913 | A | * | 8/1957 | Marzano | 43/17 |
| 2,955,374 | A | * | 10/1960 | Matzo et al. | 43/16 |
| 3,645,029 | A | * | 2/1972 | Roemer | 43/17 |
| 4,566,216 | A | * | 1/1986 | Randall | 43/17 |
| 5,224,284 | A | * | 7/1993 | Kelsey et al. | 43/17 |
| 5,297,357 | A | * | 3/1994 | Bigelow et al. | 43/17 |
| 6,519,893 | B2 | * | 2/2003 | Shook | 43/17 |
| 2002/0139033 | A1 | * | 10/2002 | Scherg | 43/17 |

* cited by examiner

*Primary Examiner* — Darren W Ark
*Assistant Examiner* — George Andonyan
(74) *Attorney, Agent, or Firm* — Donald J. Ersler

(57) ABSTRACT

An ice fishing strike indicator preferably includes a support base and a strike indicator. The strike indicator preferably includes an indicator housing, a pop-up indicator and a trigger member. The pop-up indicator is slidably biased upward in the indicator housing. The trigger member preferably includes a support tube, a trigger rod and a fishing line reel. The support tube is retained by the indicator housing and adjustably retained by the support base. The trigger rod is slidably retained in the support tube. A trigger finger is formed on one end of the trigger rod and the fishing line reel is retained on the other end thereof. The trigger finger hooks into the pop-up indicator. Rotation of the fishing line reel by a fish strike causes the trigger finger to release the pop-up indicator. A light emitting strike indicator may be used for night time fishing.

10 Claims, 6 Drawing Sheets

ICE FISHING STRIKE INDICATOR

CROSS-REFERENCES TO RELATED APPLICATIONS

This is a nonprovisional patent application taking priority from provisional application No. 61/599,520 filed on Feb. 16, 2012.

BACKGROUND OF THE INVENTION

1. Field of the Invention

The present invention relates generally to ice fishing and more specifically to an ice fishing strike indicator, which is not falsely triggered by outdoor elements.

2. Discussion of the Prior Art

There are numerous ice fishing tip-ups and strike indicators for showing that a fish has struck a baited line. However, most of the fishing tip-ups and strike indicators can be falsely trigger by rain, freezing rain, snow, blowing snow and wind. Further, a tip-up with a flag may not be seen from all angles, especially when the wind is blowing.

Accordingly, there is a clearly felt need in the art for a ice fishing strike indicator, which may be seen from any angle and is not falsely trigger by rain, freezing rain, snow, blowing snow and wind.

SUMMARY OF THE INVENTION

The present invention provides an ice fishing strike indicator, which is not falsely triggered by outdoor elements. The ice fishing strike indicator preferably includes a support base and a strike indicator. The support base may have any suitable shape and size to securely support the strike indicator. The strike indicator preferably includes an indicator housing, a pop-up indicator, a cover cap and a trigger member. The indicator housing includes an inner perimeter, which is sized to slidably receive the pop-up indicator. The pop-up indicator is biased upward with a spring or the like. A retention rim is preferably formed on a bottom of the pop-up indicator. At least a portion of the cover cap is preferably fabricated from a clear or translucent material. The cover cap is removably engaged with the indicator housing.

The trigger member preferably includes a support tube, a trigger rod, a fishing line reel and a line support. One end of the support tube is retained in a bottom of the indicator housing. An outer perimeter of the support tube is adjustably retained by the support base. An inner perimeter of the support tube is sized to rotatably retain an outer perimeter of the trigger rod. One end of the trigger rod is bent to form a trigger finger. The other end of the trigger rod is threaded. The trigger rod is inserted into a compression spring. The compression spring is retained between the trigger finger and the one end of the support tube. The line support is rotatably retained on the outer perimeter of the support tube. The fishing line reel is threaded on to the other end of the trigger rod and secured with a jam nut. In use, rotation of the fishing line reel by a fish strike causes the trigger finger to turn and release the pop-up indicator.

A light emitting strike indicator preferably includes a strike base, a normally closed switch, a light emitting device a lighted trigger rod and a power source. The pop-up indicator is removed from the indicator housing. The strike base is retained by the support base. The lighted trigger rod is axially retained by the strike base. One end of the trigger rod is bent to form a switch leg. The other end of the lighted trigger rod is bent to form a trigger leg. The switch leg is placed over the normally closed switch and the trigger leg is retained under the trigger finger, which causes the normally closed switch to have an electrically open circuit. The power source is connected to the switch and the light emitting device.

In use, rotation of the fishing line reel by a fish strike causes the trigger finger to turn and release the trigger leg, which causes the switch leg to release the normally closed switch from the electrical open circuit. Return to a normally closed electrical circuit supplies power to light emitting device, which indicates a fish strike.

Accordingly, it is an object of the present invention to provide an ice fishing strike indicator, which may be seen from any angle.

Finally, it is another object of the present invention to provide an ice fishing strike indicator, which is not falsely trigger by rain, freezing rain, snow, blowing snow and wind.

These and additional objects, advantages, features and benefits of the present invention will become apparent from the following specification.

DETAILED DESCRIPTION OF THE PREFERRED EMBODIMENTS

Figure 1:
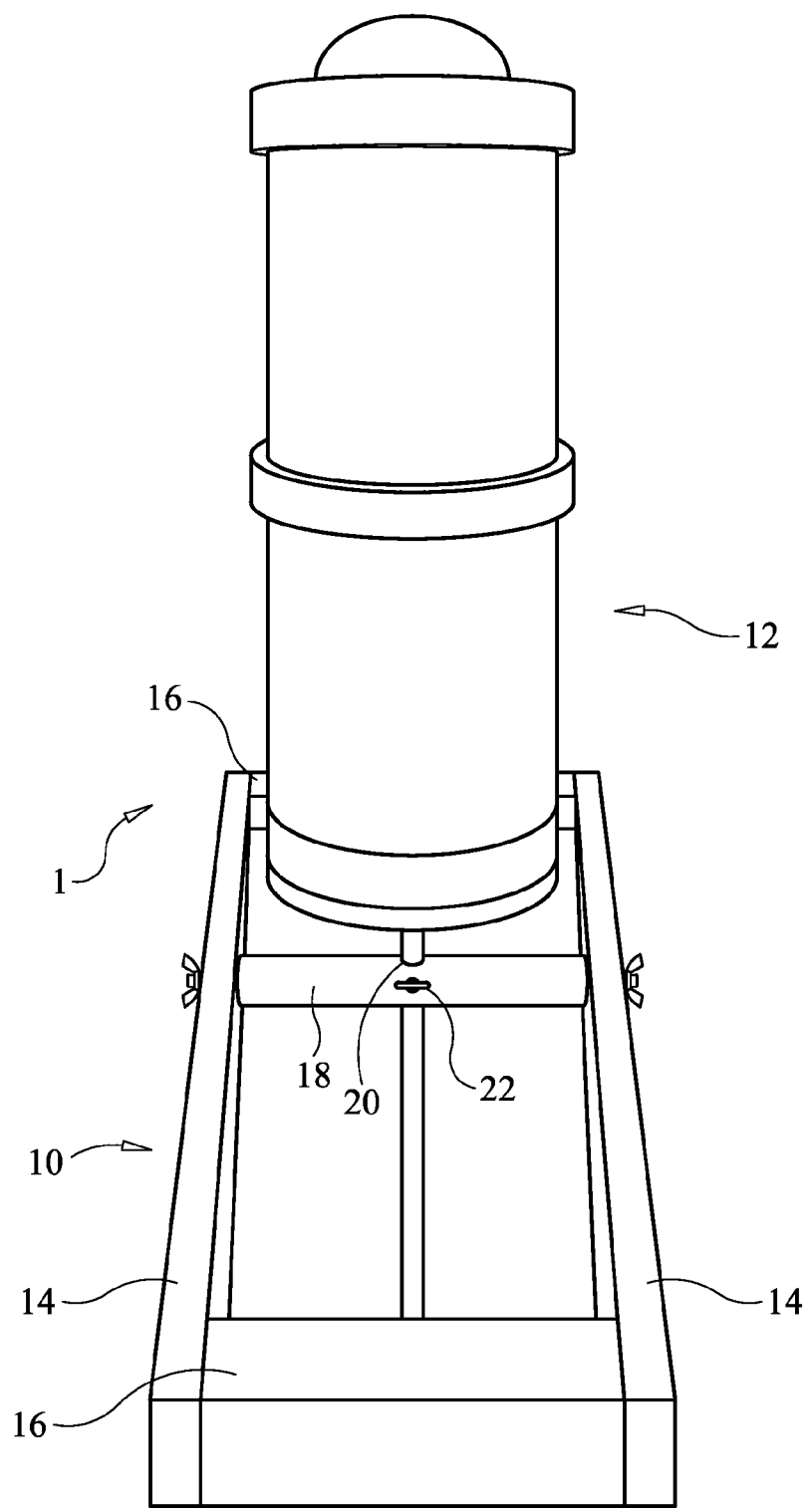
FIG. 1 is a perspective view of an ice fishing strike indicator in accordance with the present invention.
Figure 2:
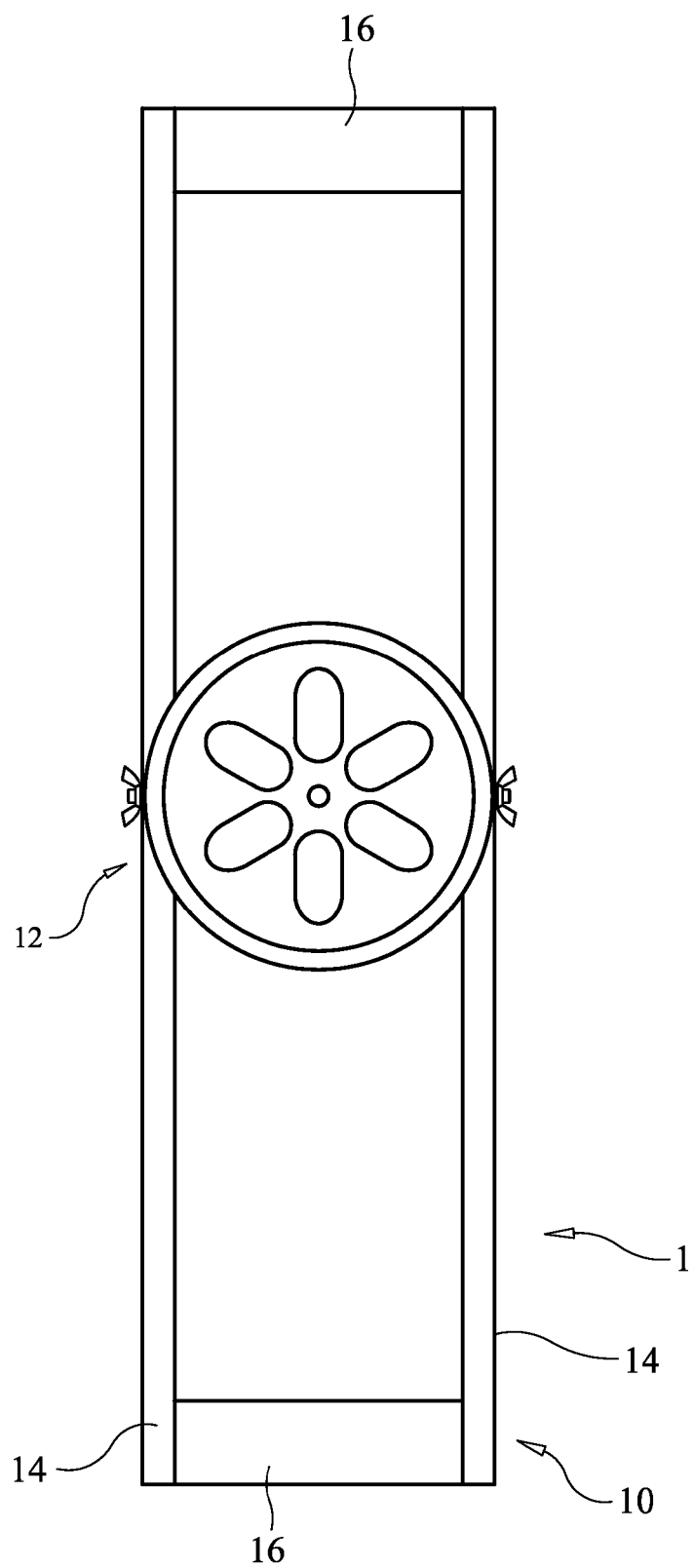
FIG. 2 is a top view of an ice fishing strike indicator in accordance with the present invention.

With reference now to the drawings, and particularly to FIG. 1, there is shown a perspective view of an ice fishing strike indicator 1. With reference to FIG. 2, the ice fishing strike indicator 1 preferably includes a support base 10 and a strike indicator 12. The support base 10 is placed across an open hole in a ice layer (not shown). The support base 10 preferably includes a pair of lengthwise base members 14, two end base members 16 and a base cross member 18. One end base member 16 is attached to one end of the lengthwise base members 14 and the other end base member 16 is attached to the other end of the lengthwise base members 14. A base cross member 18 is attached to a middle of the lengthwise base members 14. An adjustment hole 20 is formed through the base cross member 18 and a thumb screw 22 is threadably engaged with the base cross member 18, adjacent the adjustment hole 20. However, the support base 10 may have any suitable shape and size to securely support the strike indicator 12.

Figure 3:
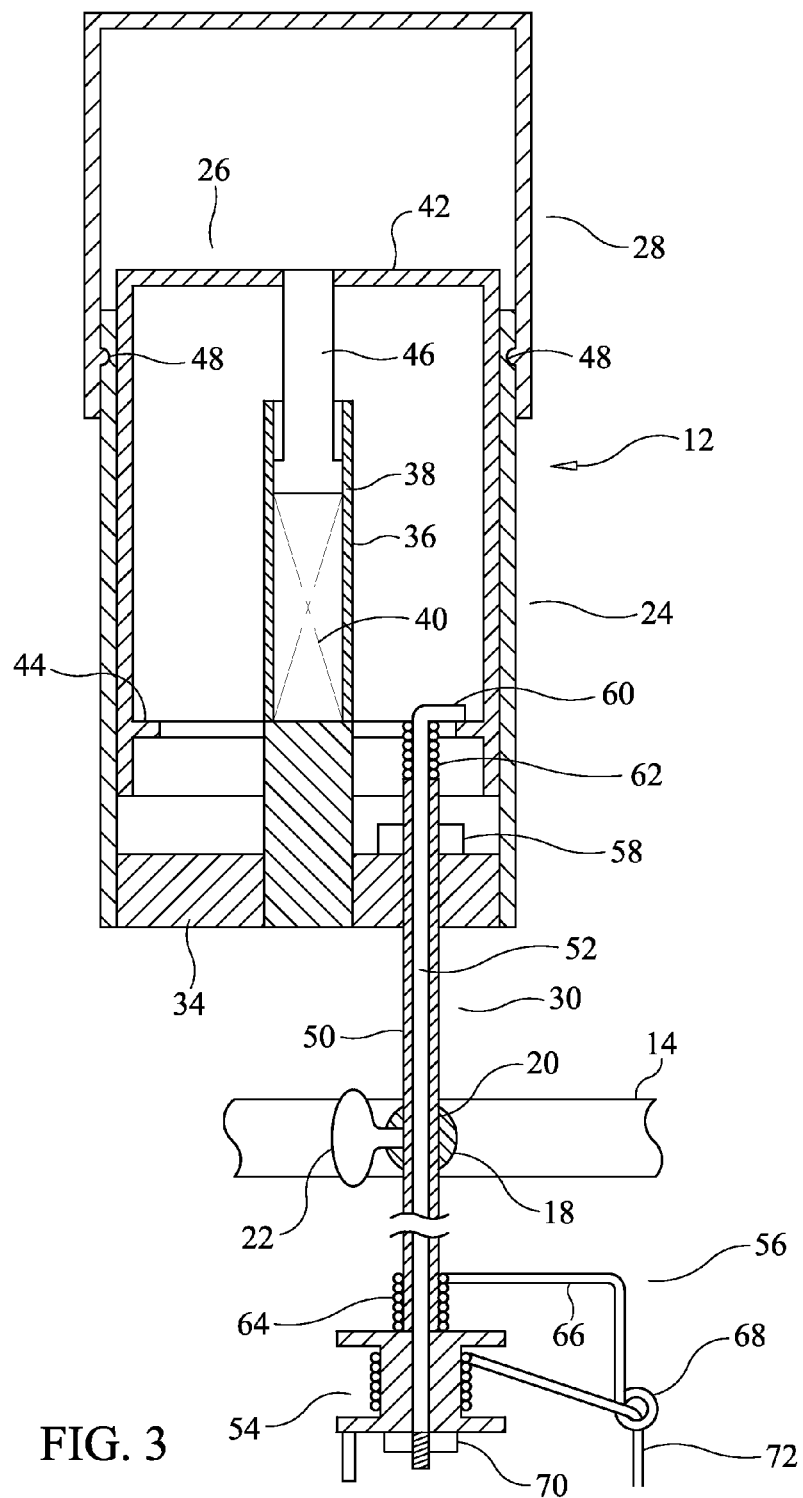
FIG. 3 is a cross sectional view of a strike indicator with a pop-up indicator, before a fish has struck a baited line of an ice fishing strike indicator in accordance with the present invention.
Figure 4:
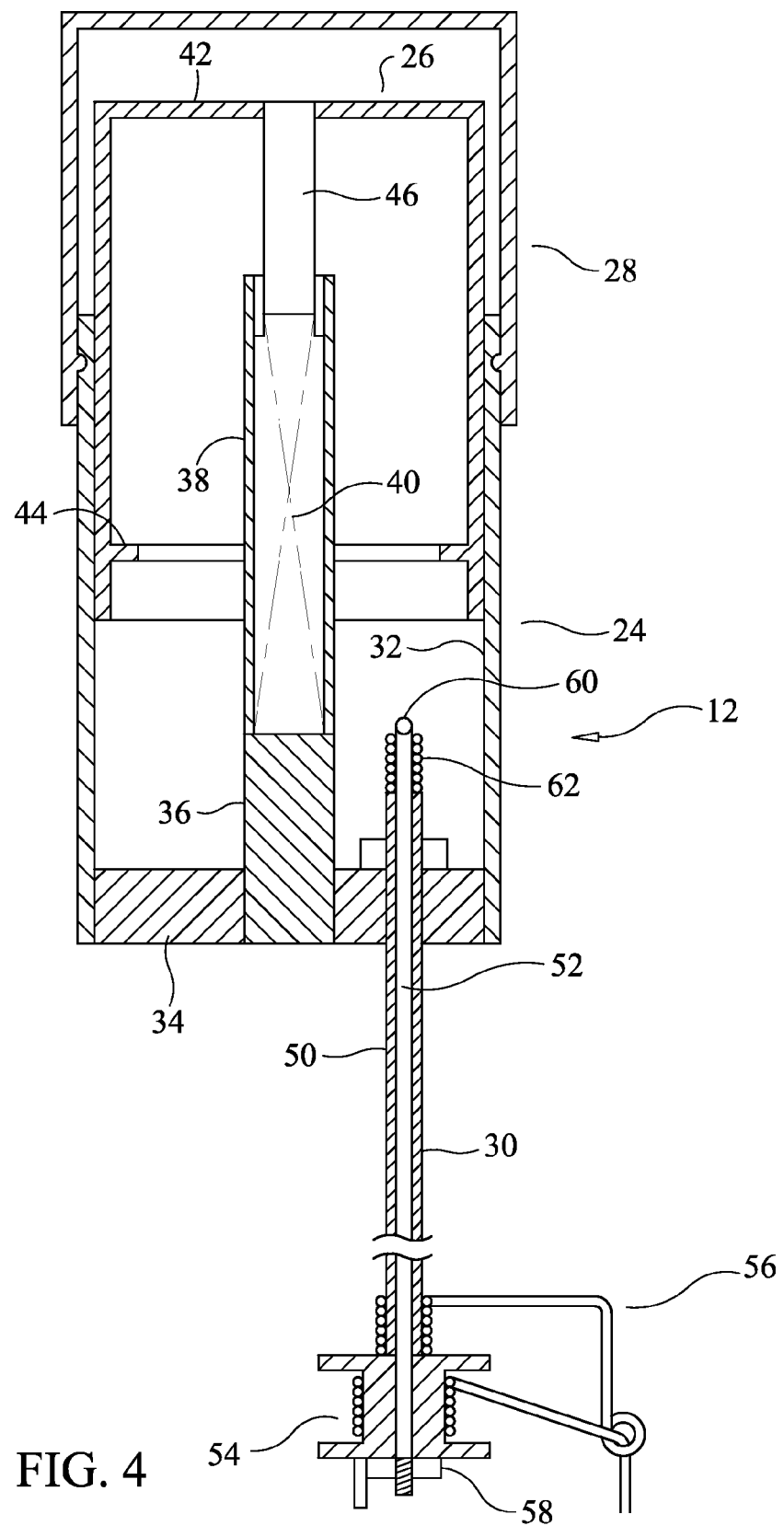
FIG. 4 is a cross sectional view of a strike indicator with a pop-up indicator, after a fish has struck a baited line of an ice fishing strike indicator in accordance with the present invention.
Figure 5:
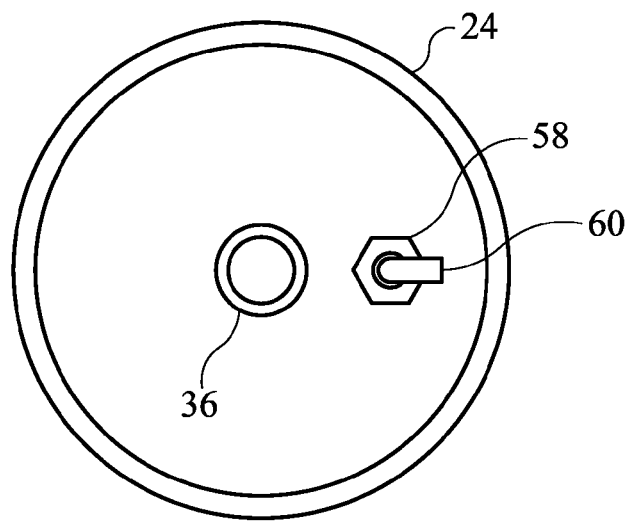
FIG. 5 is a top view of an indicator housing, after removal of a pop-up indicator of an ice fishing strike indicator in accordance with the present invention.

With reference to FIGS. 3-5, the strike indicator 12 preferably includes an indicator housing 24, a pop-up indicator 26, a cover cap 28 and a trigger member 30. The indicator housing 24 preferably includes an inner perimeter 32, a bottom end 34 and a spring post 36. The inner perimeter 32 is sized to slidably receive an outer perimeter of the pop-up indicator 26. The spring post 36 includes a spring bore 38, which is sized to receive a compression spring 40. The pop-up indicator 26 preferably includes an inverted cup 42, a retention rim 44, and a spring pole 46. The retention rim 44 is preferably formed on an inner perimeter of the inverted cup 42 at substantially a bottom thereof. The spring pole 46 extends downward from a top of the inverted cup 42. An outer perimeter of the spring pole 46 is sized to be received by the spring bore 38.

The cover cap 28 preferably has the shape of an inverted cup. A portion of said cover cap 28 is fabricated from a clear or translucent material to illustrate a position of the pop-up indicator 26. An inner perimeter of the cover cap 28 is preferably sized to receive an outer perimeter of the indicator housing 24. The indicator housing 24 preferably includes grooves formed in an outer perimeter thereof for retaining at least one projection 48 formed on an inner perimeter of the cover cap 28, such that the cover cap 28 is removably engaged with the indicator housing 24.

The trigger member 30 preferably includes a support tube 50, a trigger rod 52, a fishing line reel 54 and a line support 56. One end of the support tube 50 is preferably threaded into the bottom end 34 of the indicator housing 24. A jam nut 58 is used to secure the support tube 50 to the bottom end 34. A height of the strike indicator 12 is adjusted relative to the support base 10 by moving the support tube 50 relative to the base cross member 18 and tightening the thumb screw 22. An inner perimeter of the support tube 50 is sized to rotatably retain an outer perimeter of the trigger rod 52. One end of the trigger rod 52 is bent over substantially perpendicular to the trigger rod 52 to form a trigger finger 60. The other end of the trigger rod 52 is threaded. The trigger rod 52 is inserted into a rod compression spring 62. The rod compression spring 62 is retained between the trigger finger 60 and the one end of the support tube 50.

The line support 56 preferably includes a tube base 64, an extension arm 66 and a line loop 68. One end of the extension arm 66 extends from the tube base 64 and the line loop 68 extends from the other end of the extension arm 66. The tube base 64, the extension arm 66 and the line loop 68 are preferably fabricated from a single piece of wire. The single piece of wire is coiled on one end to form the tube base 64. The support rod 50 is inserted through tube base 64 and rotatably retained on the outer perimeter of the support tube 50. The fishing line reel 54 is threaded on to the other end of the trigger rod 52 and prevented from rotation relative to the trigger rod 52 by securing a jam nut 70 against the fishing line reel 54. A quantity of fishing line 72 is retained on the fishing line reel 54 and inserted through the line loop 68.

In use, the pop-up indicator 26 is pushed into the indicator housing 24, such that the retention rim 44 is below the trigger finger 60. The fishing line reel 54 is rotated, until the trigger finger 60 faces toward the inner perimeter of the indicator housing 24 to retain the pop-up indicator 26 in a pre-strike position. A top of the fishing line reel 54 is preferably marked to show the position of the trigger finger 60. A baited hook is secured to an end of the fishing line 72 (not shown). A fish strike will cause the fishing line reel 54 to rotate, which causes the trigger finger 60 to rotate and release the pop-up indicator 26 as shown in FIG. 4. The pop-up indicator 26 is protected from adverse weather conditions by the cover cap 28.

Figure 6:
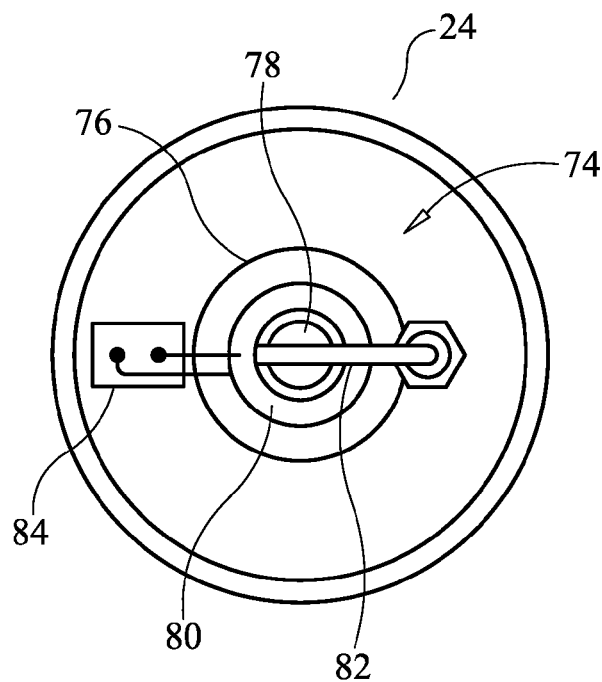
FIG. 6 is a top view of a light emitting strike indicator installed in an indicator housing of an ice fishing strike indicator in accordance with the present invention.
Figure 7:
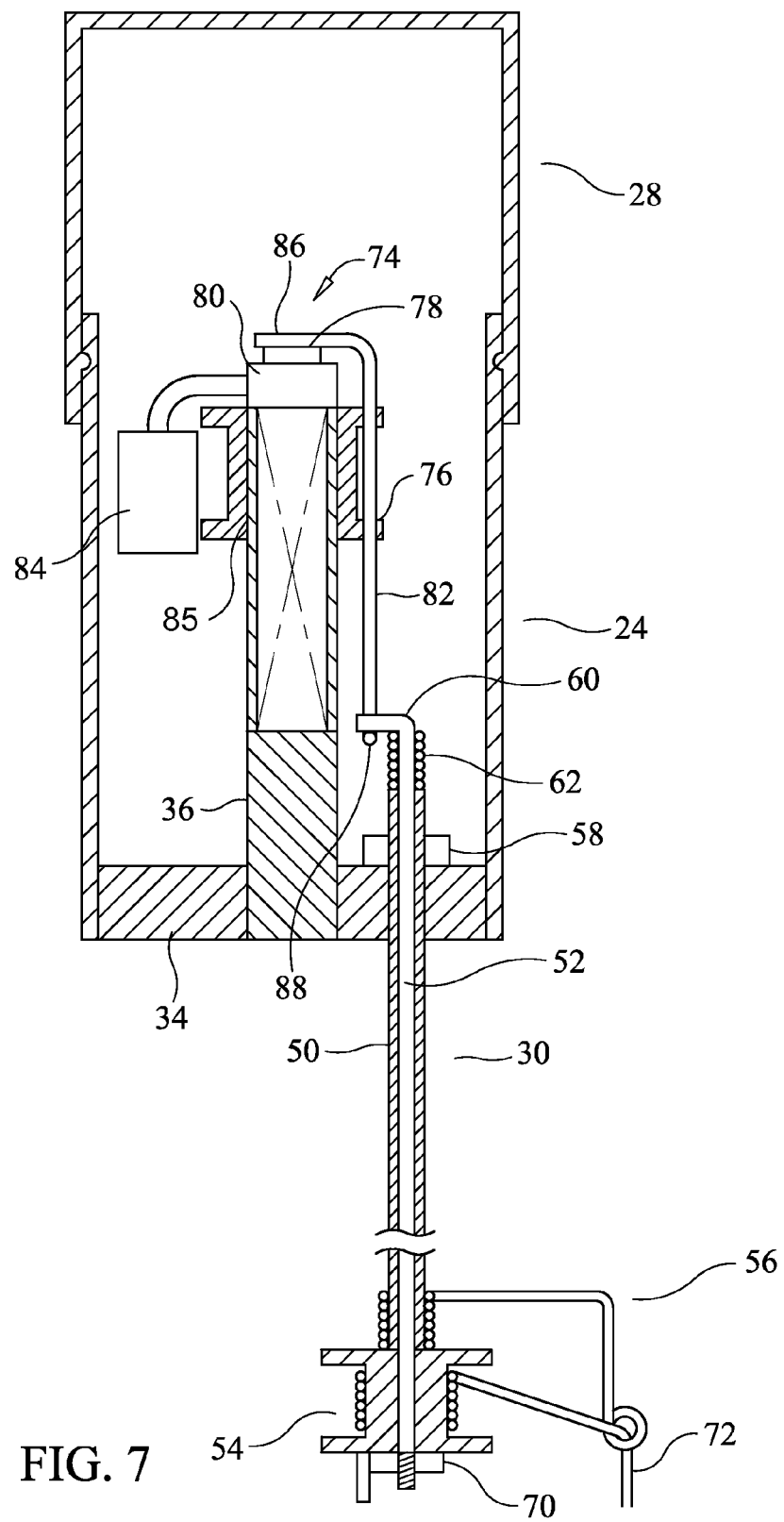
FIG. 7 is a cross sectional view of a strike indicator with a light emitting strike indicator installed in an indicator housing, before a fish has struck a baited line of an ice fishing strike indicator in accordance with the present invention.

With reference to FIGS. 6-7, a light emitting strike indicator 74 preferably includes a strike base 76, a normally closed switch 78, a light emitting device 80, a lighted trigger rod 82 and a power source 84. The strike base 76 includes a post bore 85, which is sized to receive the spring post 36. The lighted trigger rod 82 is axially retained in the strike base 76. One end of the lighted trigger rod 82 is bent over to be substantially perpendicular to the lighted trigger rod 82 to form a switch leg 86. The other end of the lighted trigger rod 82 is bent to be substantially perpendicular to the lighted trigger rod 82 to form a trigger leg 88. The switch leg 86 is placed over the normally closed switch 78 and the trigger leg 88 is retained under the trigger finger 60, which causes the normally closed switch 78 to have an electrically open circuit. The power source 84 is connected to the normally closed switch 78 and the light emitting device 80. The light emitting device 80 may be a light emitting diode, an incandescent bulb or any other suitable light emitting device.

In use, the fishing line reel 54 is rotated, until the trigger finger 60 hooks over the trigger leg 88 and pulls the normally closed switch 78 into an electrical open circuit. A fish strike will cause rotation of the fishing line reel 54, which causes the trigger finger 60 to rotate and release the switch leg 86 from the normally closed switch 78. Electrical power will then be provided from the power source 84 to the light emitting device 80. The light emitting strike indicator 74 is protected from adverse weather conditions by the cover cap 28.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An ice fishing strike indicator comprising:
a support base;
a strike indicator includes an indicator housing and a pop-up indicator, said pop-up indicator is slidably retained in said indicator housing, said indicator housing includes a bottom end, a spring post extends upward from said bottom end, a spring pole is biased away from an end of said spring post with a pole spring, an end of said spring pole is engaged with one end of said pop-up indicator, said spring pole biases said pop-up indicator away from said bottom end, a retention rim is formed on an inside perimeter of said pop-up indicator adjacent the other end of said pop-up indicator; and
a trigger member includes a support tube, a trigger rod and a fishing line reel, one end of said support tube is retained in said bottom end of said indicator housing, said support tube is retained by said support base, said trigger rod is slidably retained in said support tube, said trigger rod is terminated with a trigger finger, said trigger finger engages said retention rim, said fishing line reel is secured to the other end of said trigger rod, wherein rotation of said fishing line reel causes said trigger finger of said trigger rod to release said pop-up indicator; and
a cover cap is engaged with said indicator housing, wherein said cover cap encloses said pop-up indicator after said pop-up indicator is released.

2. The ice fishing strike indicator of claim 1 wherein:
a position of said support tube is adjustable relative to said support base.

3. The ice fishing strike indicator of claim 1 wherein:
a spring bore is formed in said spring post to retain pole spring.

4. The ice fishing strike indicator of claim 1, further comprising:
a line support is rotatably retained on said support tube, said line support includes a line loop, a fishing line is inserted through said line loop.

5. The ice fishing strike indicator of claim 1, further comprising:
a rod compression spring is retained between said trigger finger of said trigger rod and a top of said support tube.

6. An ice fishing strike indicator comprising:
a support base;
a strike indicator includes an indicator housing and a pop-up indicator, said pop-up indicator is slidably retained in said indicator housing, said indicator housing includes a bottom end, a spring post extends upward from said bottom end, a spring pole is biased from an end of said spring post with a pole spring, an end of said spring pole is engaged with one end of said pop-up indicator, said spring pole biases said pop-up indicator away from said bottom end, a retention rim is formed on an inside perimeter of said pop-up indicator adjacent the other end of said pop-up indicator; and
a trigger member includes a support tube, a trigger rod and a fishing line reel, one end of said support tube is retained in said bottom end of said indicator housing, said support tube is retained by said support base, said trigger rod is slidably retained in said support tube, said trigger rod is terminated with a trigger finger, said trigger finger engages said retention rim, said fishing line reel is secured to the other end of said trigger rod, wherein rotation of said fishing line reel causes said trigger finger of said trigger rod to release said pop-up indicator; and
a cover cap is engaged with said indicator housing, at least a portion of said cover cap is fabricated from a clear or translucent material, wherein said cover cap encloses said pop-up indicator after said pop-up indicator is released.

7. The ice fishing strike indicator of claim 6 wherein:
a position of said support tube is adjustable relative to said support base.

8. The ice fishing strike indicator of claim 6 wherein:
a spring bore is formed in said spring post to retain said pole spring.

9. The ice fishing strike indicator of claim 6, further comprising:
a line support is rotatably retained on said support tube, said line support includes a line loop, a fishing line is inserted through said line loop.

10. The ice fishing strike indicator of claim 6, further comprising:
a rod compression spring is retained between said trigger finger of said trigger rod and a top of said support tube.

* * * * *